United States Patent [19]

Morimoto et al.

[11] Patent Number: 4,487,302

[45] Date of Patent: Dec. 11, 1984

[54] PARKING LOCK ARRANGEMENT FOR CONTINUOUSLY VARIABLE V-BELT TRANSMISSION

[75] Inventors: Yoshiro Morimoto, Yokosuka; Sigeaki Yamamuro, Zushi; Hiroyuki Hirano, Yokosuka; Yoshikazu Tanaka, Yokohama, all of Japan

[73] Assignee: Nissan Motor Company, Limited, Yokohama, Japan

[21] Appl. No.: 367,924

[22] Filed: Apr. 13, 1982

[30] Foreign Application Priority Data

Apr. 21, 1981 [JP] Japan .................................. 56-59276
Apr. 21, 1981 [JP] Japan .................................. 56-59277

[51] Int. Cl.$^3$ .............................................. B60K 41/26
[52] U.S. Cl. .................................. 192/4 A; 74/411.5; 74/710.5
[58] Field of Search ........... 192/4 A; 74/710.5, 411.5; 474/72; 188/31, 60, 69

[56] References Cited

U.S. PATENT DOCUMENTS

| | | | |
|---|---|---|---|
| 3,442,346 | 5/1969 | Winter et al. | 474/72 X |
| 3,642,103 | 2/1972 | Schott | 192/4 A |
| 4,089,394 | 5/1978 | Haupt et al. | 192/4 A |
| 4,304,150 | 12/1981 | Lupo et al. | 474/72 |

FOREIGN PATENT DOCUMENTS

| | | |
|---|---|---|
| 1348220 | 3/1974 | United Kingdom . |
| 2033505 | 10/1978 | United Kingdom . |
| 1534442 | 12/1978 | United Kingdom . |
| 2033500 | 5/1980 | United Kingdom . |

Primary Examiner—George H. Krizmanich
Attorney, Agent, or Firm—Schwartz, Jeffery, Schwaab, Mack, Blumenthal & Koch

[57] ABSTRACT

According to the present invention, a parking gear is rotatable with that rotary member which is in driving connection with a differential. The rotary member is released from a continuously variable V-belt transmission unit upon setting a manual shift lever in "P" position. When the manual shift lever is set to the "P" position, the parking gear is locked.

4 Claims, 4 Drawing Figures

PARKING LOCK ARRANGEMENT FOR CONTINUOUSLY VARIABLE V-BELT TRANSMISSION

BACKGROUND OF THE INVENTION

The present invention relates to a continuously variable V-belt transmission, and more particularly to a parking lock arrangement for a continuously variable V-belt transmission.

SUMMARY OF THE INVENTION

According to the present invention, a parking gear is rotatable with the rotary member which is in driving connection with a differential. The rotary member is selectively connectable with a continuously variable V-belt transmission unit. When a manual shift lever is set to a parking position, the parking gear is locked.

According to a specific feature of the present invention, a manual lever and a parking lever are fixedly attached to a shaft which is rotatably supported by a case.

An object of the present invention is therefore to provide a parking lock arrangement for a continuously variable V-belt transmission which is simple and reliable in operation.

BRIEF DESCRIPTION OF THE DRAWINGS

The present invention is more specifically described in connection with the accompanying drawings, wherein.

DESCRIPTION OF EMBODIMENTS

Referring to the accompanying drawings, a first embodiment is described hereinafter in connection with FIGS. 1 to 3.

Figure 1:
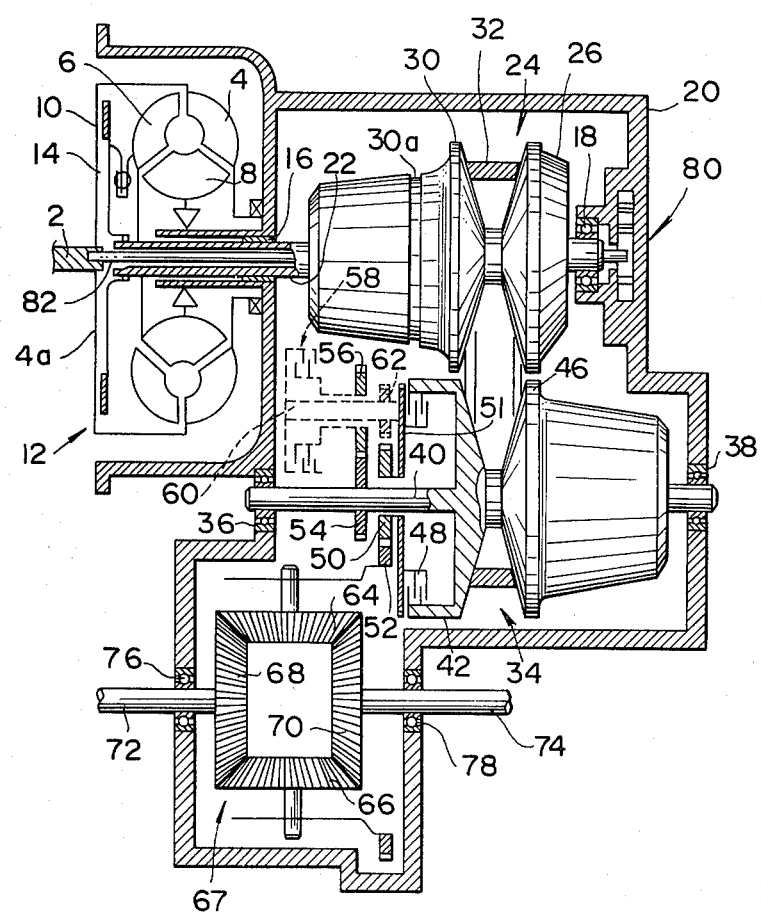
FIG. 1 is a diagrammatic view illustrating a power transmission mechanism of a continuously variable transmission.

As illustrated in FIG. 1, an engine output shaft 2 which is in rotary unison with a crankshaft (not illustrated) has mounted thereon a hydrodynamic transmission unit in the form of a torque converter 12 (it may be replaced with a fluid coupling) which includes a pump impeller 4, a turbine roller 6, a stator 8 and a lock-up clutch 10. The lock-up clutch 10 is coupled with a turbine runner 6 and is axially slidable, the lock-up clutch 10 cooperating with a converter shell 4a coupled with the engine output shaft 2 integral with the pump impeller 4 to form a lock-up clutch oil chamber 14. In operation, when the oil pressure within this lock-up clutch oil chamber 14 drops below the oil pressure within the torque converter 12, this pressure difference urges the lock-up clutch 10 against the member 4a for unitary rotation with same. The turbine runner 6 is splined to one end portion of a drive shaft 22 rotatably supported by a transmission case 20 via bearings 16 and 18. A drive pulley 24 is mounted on the drive shaft 22 between the bearings 16 and 18.

The drive pulley 24 comprises an axially fixed conical disc fixedly secured to the drive shaft 22 and an axially movable conical disc 30 which is arranged in a face-to-face relationship with the axially fixed conical disc 26 to define a V-shaped pulley groove and which is axially slidable along the drive shaft 22 by the oil pressure acting within the drive pulley cylinder chamber (not illustrated). The drive pulley 24 is drivingly connected to a driven pulley 34 by a V-belt 32, the driven pulley 34 being mounted on a driven shaft 40 rotatably supported by the transmission case 20 by means of bearings 36 and 38. The driven pulley 34 comprises an axially fixed conical disc 42 fixedly secured to the driven shaft 40 and an axially movable conical disc 46 which is arranged in a face-to-face relationship with the axially fixed conical disk 42 to define a V-shaped pulley groove and which is axially slidable along the driven shaft 40 by the oil pressure acting within the driven pulley cylinder chamber (not illustrated).

A rotary member in the form of forward drive gear 50 which is rotatably supported by the driven shaft 40 is engageable with the fixed conical disc 42 via a forward multiple disc clutch 48, the forward drive gear 50 meshing with a ring gear 52. Fixed to the driven shaft 40 is a reverse drive gear 54 which meshes with an idle gear 56. The idle gear 56 is engageable with an idle shaft 60 via a reverse multiple disc clutch 58. The idle shaft 60 has fixed thereto another idle gear 62 which meshes with the ring gear 52. (It is to be understood that in the case of FIG. 1 for ease of illustration the idle gear 62, idle shaft 60 and reverse multiple disc clutch 58 are illustrated as displaced from their proper positions so that the idle gear 62 appears to be out of meshing with the ring gear 52, but they actually mesh with each other as shown in FIG. 2.) Connected to the ring gear 52 for rotation therewith are a pair of pinion gears 64 and 66, and a pair of side gears 68 and 70 meshing with this pair of pinion gears 64 and 66 to form a differential 67 and coupled with the output shafts 72 and 74, respectively.

The output shafts 72 and 74 are rotatably supported by bearings 76 and 78, respectively, and extend in the opposite directions outwardly of the case 20. These output shafts 72 and 74 are supposedly coupled with road wheels, not illustrated. On the right of the bearing 18 is arranged an internally meshing gear type oil pump 80 serving as a source of oil pressure for an hydraulic control apparatus. The oil pump 80 is driven by the engine output shaft 2 through an oil pump drive shaft 82 extending through the hollow drive shaft 22.

Rotational power is fed from the engine output shaft 2 to the continuously variable V-belt transmission including the torque converter 12 with the lock-up clutch 10, continuously variable V-belt transmission unit and differential 67. The power is delivered to the torque converter 12, drive shaft 22, drive pulley 24, V-belt 32, driven pulley 34, driven shaft 40 in this sequence, and further to the forward drive gear 50, ring gear 52, diferential 67 and then to the output shafts 72 and 74 to rotate them in the forward direction when the forward multiple disc clutch 48 is engaged with the reverse multiple disc clutch 58 released, or delivered further to the reverse drive gear 54, idle gear 56, idle shaft 60, idle gear 62, ring gear 52, differential and the output shafts 72 and 74 to rotate them in the reverse direction when the reverse multiple disc clutch 58 is engaged with the forward multiple disc clutch 48 released. During this transmission of power a rotational ratio between the drive pulley 24 and driven pulley 34 can be varied by axially displacing the movable conical disc 30 of the drive pulley 24 and the movable conical disc 46 of the driven pulley 34 in a manner to vary the effective radius of running diameter of the V-belt 34. For example, if the width of the V-shaped groove of the drive pulley 24 is increased and at the same time the width of the V-shaped pulley groove of the driven pulley 34 is reduced, the radius of the diameter on the drive pulley 24 contacting with the V-belt reduces and the radius of the diameter on the driven pulley 34 contacting with the V-belt increases, thus providing a high reduction ratio. If the movable conical discs 30 and 46 are displaced in the reverse directions, the reduction ratio decreases. During the transmission of power, although the torque converter 12 has a state wherein it effects the torque multiplication or a state wherein it serves as a fluid coupling depending upon operation state, since the torque converter 12 is provided with the lock-up clutch 10 attached to the turbine runner 6, the engine output shaft 2 can be mechanically and directly coupled with the drive shaft 22 if draining the oil pressure is discharged from the lock-up clutch oil chamber 14 to allow the lock-up clutch 10 to be pressed against the converter shell 4a integral with the pump impeller 4.

Figure 2:
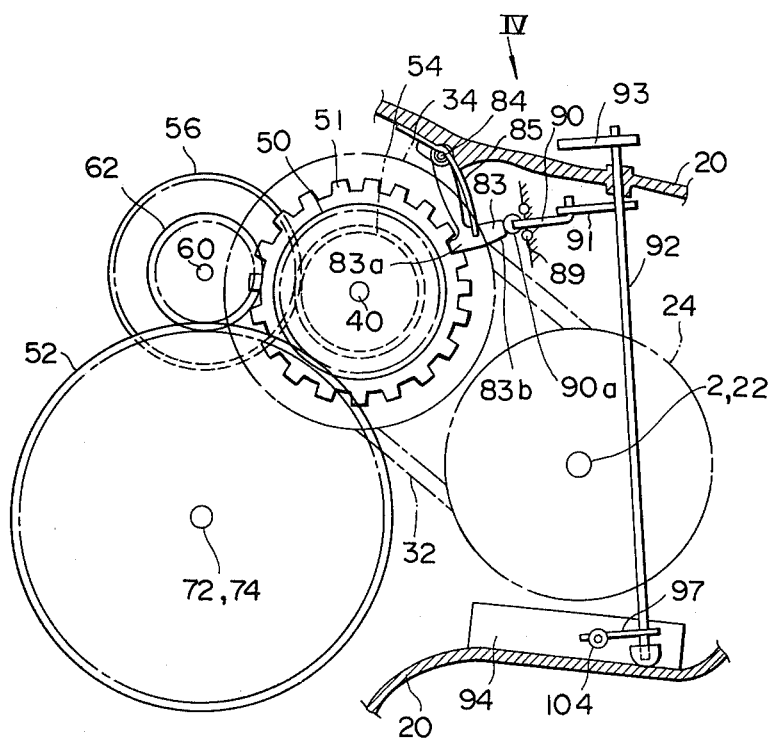
FIG. 2 is a diagrammatic section of the continuously variable V-belt transmission taken through a plane showing a parking gear of a parking lock arrangement embodying the invention in cooperative relationship with pulleys, gears, and the other component parts of the parking lock arrangement.
Figure 3:
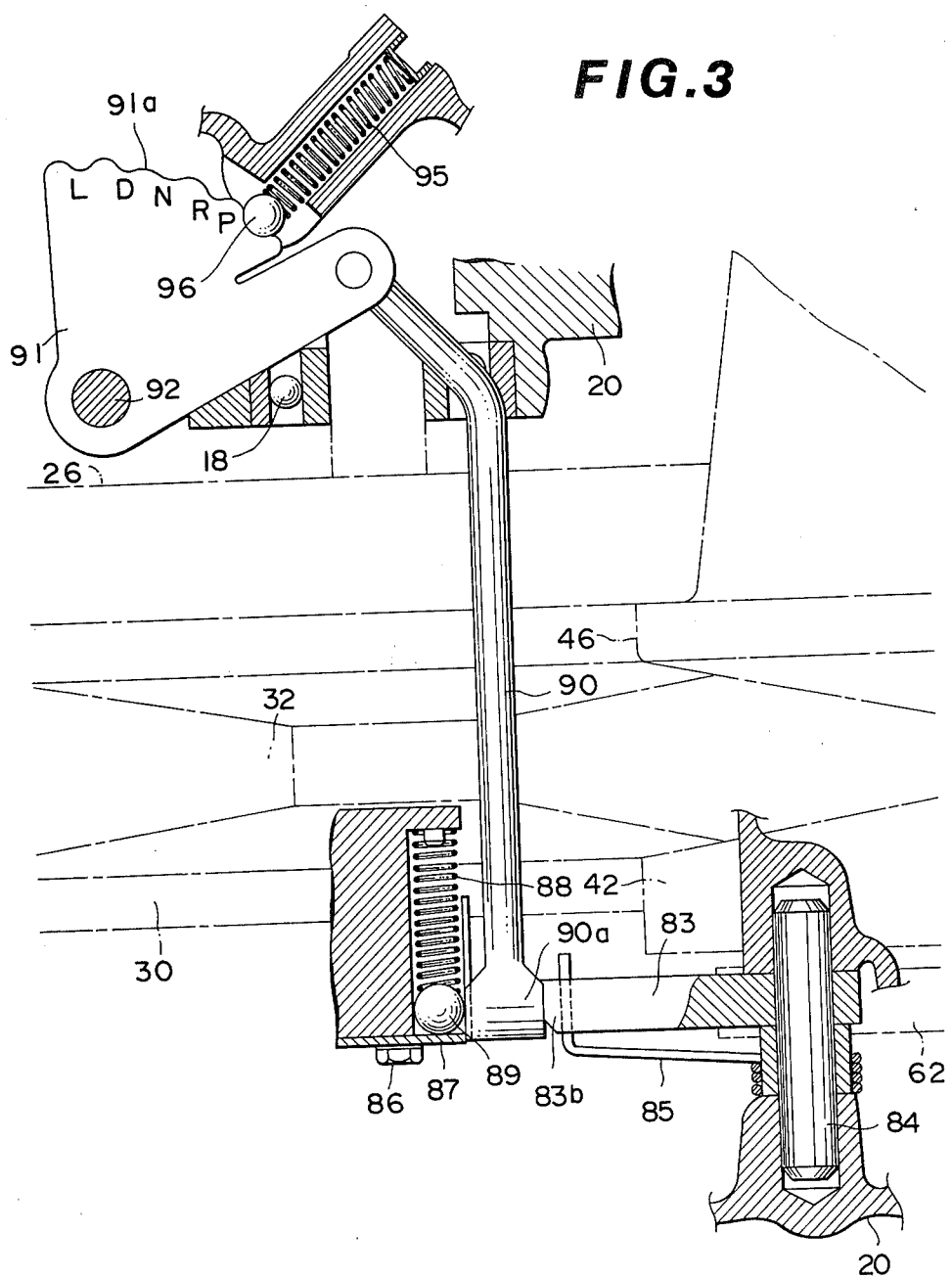
FIG. 3 is a detailed view as viewing along an arrow IV of FIG. 2.

Referring particularly to FIGS. 2 and 3, a parking lock is explained. In FIG. 3 which specifically illustrates the structure of the parking lock, the fixed conical discs 26, 42, movable conical disc 30, 46 and V-belt 32 are illustrated by phantom line.

A pawl 83 is pivoted to the transmission case 20 by a pin 84 in such a matter as to engage a parking gear 51 which is fixedly attached to the forward drive gear 50 for rotation therewith. The pawl 83 has a tooth 83a and a back portion 83b and is biased by a spring 85 in a direction toward a disengaged position (counter clockwise direction viewing in FIG. 2). A parking rod 90 is arranged between the back portion 83b of the pawl 83 and two balls 89 which are biased by a spring 88 against a support member 87 attached to the transmission case 20 by a screw 86. The parking rod 90 is formed at its one edge with an enlarged diameter portion 90a. The other end of the parking rod 90 is linked to the parking lever 91. The enlarged diameter portion 90a is arranged such that it aligns with the balls 89 and the back portion 83b of the pawl 83 as shown in FIG. 3 when a manual shift lever for the parking outer lever 93 is set in "P" position. The parking lever 91 is fixedly attached to a control shaft 92 for rotation therewith. The control shaft 92 has one end pivoted to the transmission case 20 and connected to be rotatable by the parking outer lever 93. The other end of the shaft 92 extends into the inside of the transmission and is pivoted to a portion of a valve body 94 (may be pivoted to the transmission case 20) and fixedly attached to a lever 97 for actuating the spool 104 of manual selector valve. The lever 97 engages with the spool 104 slidably disposed within the valve body 94, i.e., a hydraulic control apparatus, fixedly secured to the bottom of the transmission case 20. With this manual valve, the forward multiple disc clutch 48 and the reverse multiple clutch 58 are selectively engaged. The parking lever 93 is linked by a link mechanism, not illustrated, to the manual shift lever provided adjacent the driver's seat and is arranged to be angularly moved by predetermined angles in respose to the corresponding positions "P", "R", "N", "D", and "L" of the manual shift lever. Also formed on the parking lever 91 is a portion 91a formed on the outer periphery of a sector for being engaged by a ball 96 biased by a spring 95.

Hereinafter, the operation is explained. When the manual shift lever is set in "P" position, the control shaft 92 is rotated via the parking outer lever 93 to cause the parking lever 91 to rotate counterclockwise viewed in FIG. 3, thus pulling the parking rod 90. This causes the enlarged diameter portion 90a of the parking rod 90 to ride on the balls 89, thus pressing the back 83b of the pawl 83. Thus, the pawl 83 is urged to an engaged position wherein the tooth 83a meshes with the gear 51. Therefore, the parking gear 51 is held stationary against rotation. The parking gear 51 is integral with the forward drive gear 50, the forward gear 50 meshing always with the ring gear 52 of the differential 67, causing the output shafts 72 and 74 to be held stationary. When, in "P" position, the actuation of the spool 104 of manual selector valve releases the forward multiple disc clutch 48, thus completely isolating the parking gear 51 from power transmission state with the driven pulley 34, allowing the power transmission system upstream of the driven pulley 34 to freely rotate even in this parking state. Rotation of the shaft 92 causes rotation of the lever 97 for the manual selector valve, thus causing the spool 104 of the manual valve to move axially. The parking lever 91 is formed with check grooves corresponding to "P", "R", "N", "D", "L" positions of the manual shift lever, respectively, and since the ball 96 is biased by the spring 95 to engage these grooves selectively, the parking lever 91 is stopped when the ball 96 engages a selective one of the grooves and the spool 104 is maintained in the corresponding position to the selective one of "P", "R", "N", "D", "L" positions. The oil pressure control apparatus with the valve body 94 is constructed such that the transmission is conditioned in the one of forward drive state or reverse drive state or neutral state depending upon the position of the spool 104.

Figure 4:
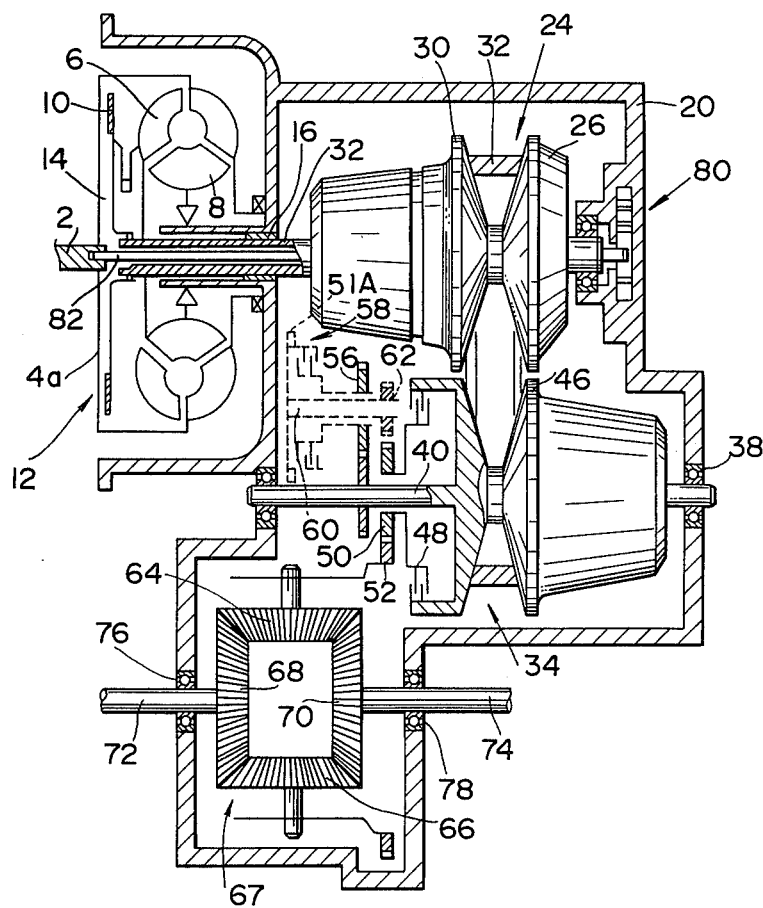
FIG. 4 illustrates another embodiment.

A parking gear 51A may be formed on a rotary member integral with the idle shaft 60 as shown in FIG. 4. The idle shaft 60 is always in power transmission state with the ring gear 52 via the idle gear 62 and furthermore the idle shaft 60 is isolated from the power transmission state with the driven pulley 34 when in "P" position, hence substantially the same function and effect as obtained with regard to the first embodiment are obtained.

As previously described, the parking gear is fixedly attached to the rotary member of the power train which is always in a power transmission state with the ring gear of the differential, but is out of transmission state with the continuously variable V-belt transmission unit upon selecting the parking state when the forward drive clutch is released, so that even if, during the parking, engine is caused to race, a power transmission system from the engine upto the driven pulley rotate freely, thus causing no unreasonably great force to be impressed on the V-belt transmission unit, thus causing no damage.

Since the lever for actuating the manual selector valve and the parking lever for actuating the pawl are fixedly attached to the single control shaft which is rotatable by the manual shaft lever provided adjacent a driver's seat, a reliability has been enhanced.

With the control shaft, it is now possible to link the manual selector valve and the parking lever even if they are disposed on the opposite sides of a rotatable member, such as the drive shaft.

Furthermore, in the case a continuously variable V-belt transmission provided with a drive pulley and a driven pulley which are larger in outer diameter is used to propell a motor vehicle, the driven pulley should be arranged at the upper portion of the transmission so as to secure a minimum height from the road surface, while, the hydraulic control apparatus provided with a manual selector valve should be arranged at the lower portion of the transmission for the need to suck in oil and discharge of oil and for the ease of manipulation of the manual selector valve. This has been accomplished with the use of single control shaft.

What is claimed is:

1. A continuously variable V-belt transmission comprising:
   a case;
   a continuously variable V-belt transmission unit mounted within said case, said continuously variable V-belt transmission unit having a V-belt running over a drive pulley and a driven pulley, each having cylinder chamber and two conical discs, one conical disc of the drive pulley being secured to a drive shaft, one conical disc of the driven pulley being secured to a driven shaft, the other conical disc of the drive pulley being controllably movable in an axial direction of the drive shaft in response to the fluid pressure in the cylinder chamber thereof, the other conical disc of the driven pulley being controllably movable in an axial direction of the driven shaft in response to the fluid pressure in the cylinder chamber thereof;
   a differential;
   a manual shift lever having a parking position and a forward drive range position;
   a rotary member in driving connection with said differential;
   clutch means for establishing a driving connection between said rotary member and said continuously variable V-belt transmission unit;
   a parking gear rotatable with said rotary member; and
   means for locking said parking gear when said manual shift lever is set to the parking position.

2. A continuously variable V-belt transmission as claimed in claim 1, wherein said locking means includes
   a shaft rotatably supported by said case;
   a pawl arranged to engage the parking gear;
   a parking lever fixedly attached to said shaft, said parking lever being for actuating the pawl;
   means for rotating said shaft in response to manual operation of a shift lever.

3. A continuously variable V-belt transmission as claimed in claim 2, further comprising: a manual lever fixedly attached to said shaft and a manual selector valve, said manual lever being arranged to actuate said manual selector valve, wherein said manual selector valve and said locking means are arranged near the opposite ends of said shaft, respectively.

4. A continuously variable V-belt transmission for a motor vehicle, comprising:
   a transmission case;
   a drive shaft;
   a driven shaft;
   a drive pulley including an axially fixed conical disc fixedly mounted on said drive shaft and an axially movable conical disc slidable on said drive shaft;
   a driven pulley including an axially fixed conical disc fixedly mounted on said driven shaft and an axially movable conical disc slidable on said driven shaft;
   a V-belt interconnecting said drive pulley and said driven pulley;
   a differential having a ring gear;
   direction-change gearing driven by said driven shaft and in turn driving said ring gear of said differential, said direction-change gearing comprising a forward gear rotatably mounted on said driven shaft and meshing with said ring gear of said differential, a reverse gear fixedly mounted on said driven shaft, an idle shaft, a first idle gear rotatably mounted on said idle shaft and meshing with said reverse gear, a second idle gear fixedly mounted on said idle shaft and meshing with said ring gear of said differential, a first multiple disc friction clutch for selectively connecting said forward gear to said driven shaft, and a second multiple disc friction clutch for selectively connecting said first idle gear to said idle shaft, said first multiple disc friction clutch being disposed in an annular recess formed in said axially fixed conical disc of said driven pulley; and
   a park lock arrangement including a parking hear fixedly connected to said forward gear for rotation therewith, a pawl adapted to lock said parking gear, said pawl being formed with a back portion and biased by a spring toward a disengaged position from said parking gear, a parking rod having an enlarged diameter end operatively connected to said back portion of said pawl and an opposite end, a parking lever linked to said opposite end of said parking rod, a control shaft fixedly attached to said parking lever for rotation therewith, said control shaft being rotatably mounted on said transmission case and having one end extending outwardly of said transmission case, a parking outer lever connected to said one end of said control shaft, said control shaft having an opposite end extending inwardly of said transmission case, a lever connected to said opposite end of said control shaft for actuating a spool of a manual selector valve.

* * * * *